United States Patent
Lu et al.

(10) Patent No.: US 12,463,982 B2
(45) Date of Patent: Nov. 4, 2025

(54) DATA PROCESSING METHOD AND APPARATUS AND COMPUTER-READABLE STORAGE MEDIUM

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 39 days.

(21) Appl. No.: 18/561,383

(22) PCT Filed: Jun. 22, 2022

(86) PCT No.: PCT/CN2022/100355
§ 371 (c)(1),
(2) Date: Nov. 16, 2023

(87) PCT Pub. No.: WO2023/020110
PCT Pub. Date: Feb. 23, 2023

(65) Prior Publication Data
US 2024/0259392 A1     Aug. 1, 2024

(30) Foreign Application Priority Data
Aug. 19, 2021   (CN) ......................... 202110951730.X (51) Int. Cl.
*H04L 9/40* (2022.01)
*G06K 7/10* (2006.01)

(52) U.S. Cl.
CPC .......... *H04L 63/12* (2013.01); *G06K 7/10257* (2013.01)

(58) Field of Classification Search
CPC ........................... H04L 63/12; G06K 7/10257
See application file for complete search history.

(56) References Cited

U.S. PATENT DOCUMENTS

| | | | |
|---|---|---|---|
| 6,240,091 B1* | 5/2001 | Ginzboorg | H04L 12/2801 709/229 |
| 8,121,914 B1* | 2/2012 | Drummond | H04L 63/12 705/35 |

(Continued)

*Primary Examiner* — Kristie D Shingles
(74) *Attorney, Agent, or Firm* — J. Clinton Wimbish; Maynard Nexsen PC (57) ABSTRACT

The invention provides a data processing method and device and a computer readable storage medium, and belongs to the technical field of card reader communication. The method comprises the Steps: enabling a card reader to receive and analyze a data packet which is sent by a host and conforms to a first data structural formula, judging whether a first preset field in the data packet is the same as an address of the card reader or not, if yes, determining a data packet verification mode, and verifying the data packet according to the data packet verification mode; and if the verification is passed, determining whether the data packet contains security data, if so, processing the security data in the data packet according to the key to obtain plaintext data, determining a command type, executing corresponding operation according to the command type and the plaintext data, and returning a response data packet conforming to the first data structural formula to the host. According to the invention, the communication data can be effectively prevented from being monitored, stolen and tampered, so that the security of data transmission is ensured.

7 Claims, 4 Drawing Sheets

(56) References Cited

U.S. PATENT DOCUMENTS

2003/0126084 A1\* 7/2003 Drummond ............. H04L 67/12
 707/E17.107
2009/0095812 A1\* 4/2009 Brown ................. G06K 7/0008
 235/492
2011/0016267 A1 1/2011 Lee et al.

\* cited by examiner

DATA PROCESSING METHOD AND APPARATUS AND COMPUTER-READABLE STORAGE MEDIUM

TECHNICAL FIELD

The present invention relates to a method for processing data, an apparatus for processing data, and a computer-readable storage medium therefor, which belongs to communication technology field.

BACKGROUND ART

In prior art, a card reader in an access control system requires to communicate with a host. However, communication protocols used by card reader manufactures are different with each other and the present communication protocols are public. And the data transferred in a process of communicating between the card reader and a host are in form of plaintext, therefore, the data is easily to be monitored and stolen. As a result, how to assure security of data transferred between the card reader and the host is an urgent problem to be solved.

SUMMARY OF THE INVENTION

The object of the present invention is to provide a method and an apparatus for processing data and a computer-readable storage medium therefor, which can effectively prevent communicating data from being monitored, stolen and tampered. Therefore, security of transferred data is assured.

According to one aspect of the present invention, there is provided a method for processing data, which includes:

Step 101, a card reader waits for receiving data packet sent from a host; when receiving data packet conformed to a first data structure form, execute Step 102;

Step 102, the card reader parses the received data packet, determines whether an address of a first preset field in the data packet is identical to that of the card reader, if yes, execute Step 103, otherwise, go back to Step 101;

Step 103, the card reader determines a data packet verifying mode according to a second preset field in the data packet, verifies the data packet according to the data packet verifying mode, if verifying is successful, execute Step 104, otherwise, go back to Step 101;

Step 104, the card reader determines whether secure data is contained in the data packet according to the second preset field, if yes, execute Step 105, otherwise, execute Step 107;

Step 105, the card reader acquires a first encrypted data and a first encrypted data verification value according to a fifth preset field in the data packet, acquires a first verification key, a first message authentication key, a second message authentication key and a first data key which are stored, performs computation on the first verification key, the first message authentication key, the second message authentication key, the first encrypted data and a first encrypted data length according to a first preset algorithm to obtain a second encrypted data verification value, determines whether the second encrypted data verification value is identical to the first encrypted data verification value, if yes, perform computation on the first verification key according to a second preset algorithm to obtain a third verification key, perform computation on the first encrypted data according to the third verification key, the first data key and the first encrypted data length to obtain plaintext data, execute Step 106, otherwise, go back to Step 101;

Step 106, the card reader determines command type according to a fourth preset field in the data packet, performs corresponding operation according to the command type and the plaintext data, returns a response data packet conformed to the first data structure form to the host, go back to Step 101;

Step 107, the card reader determines command type according to the fourth preset field in the data packet, performs corresponding operation according to the command type, returns a response data packet conformed to the first data structure form to the host, go back to Step 101.

According to another aspect of the present invention, there is provided an apparatus for data processing, which includes:

a receiving and paring module configured to receive data packet sent from a host, parse the received data packet;

a determining module configured to determine whether a first preset field in the data packet is identical to address of the card reader;

a verifying module configured to determine data packet verifying mode according a second preset field in the data packet, verify the data packet according to the data packet verifying mode;

a first determining module configured to determine whether the data packet contains secure data according to the second preset field;

a processing module configured to acquire encrypted data and a first encrypted data verification value according to a fifth preset field in the data packet, acquire a first verification key, a first message authentication key, a second message authentication key and a first data key which are stored, perform computation on the first verification key, the first message authentication key, the second message authentication key, the first encrypted data and a first encrypted data length according to a first preset algorithm to obtain a second encrypted data verification value, determine whether the second encrypted data verification value is identical to the first encrypted data verification value, if yes, to perform computation on the first verification key according to a second preset algorithm to obtain a third verification key, perform computation on the first encrypted data according to the third verification key, the first data key and the first encrypted data length to obtain plaintext data;

a second determining module configured to determine command type according to a fourth preset field in the data packet, perform corresponding operation according to the command type and the plaintext data to obtain a first result data, return a response data packet conformed to the first data structure form to the host; and a third determining module configured to determine command type according to the fourth preset field in the data packet, perform corresponding operation according to the command type, return a response data packet conformed to the first data structure form to the host.

According to another aspect of the present invention, there is provided an electronic device, which includes a storage configured to store non-volatile computer-readable instructions, and a processor configured to run the non-volatile computer-readable instructions to enable the processor to perform the method for data processing when the computer-readable instructions executed by the processor.

According to another aspect of the present invention, there is provided a computer-readable storage medium, which is configured to store non-volatile computer-readable instructions, when the computer-readable instructions run on the computer to enable the computer to perform the method for data processing.

According to the present invention, those data conformed to a preset data structure form are able to be transferred between the card reader and the host, the data can be encrypted with a data key in a process of communication, meanwhile, the encrypted data can be verified according to a verification key, in this way, those communication data can be prevented from being monitored, stolen and tampered, so that a security of a data transfer is assured.

EMBODIMENTS FOR CARRYING OUT THE INVENTION

The technical solutions of the present application will be dearly and completely described in the following with reference to the accompanying drawings in the embodiments of the present disclosure. It is obvious that the described embodiments are only a part of the embodiments of the present disclosure, but not all embodiments. All other embodiments obtained by those skilled in the art based on the embodiments of the present disclosure without any inventive effort are within the scope of protection.

Embodiment 1

Embodiment 1 provides a method for data processing, the method is adapted to an access control system which includes a card reader, a host and a card. In this case, there are plurality of card readers which can communicate with the host.

Figure 1:
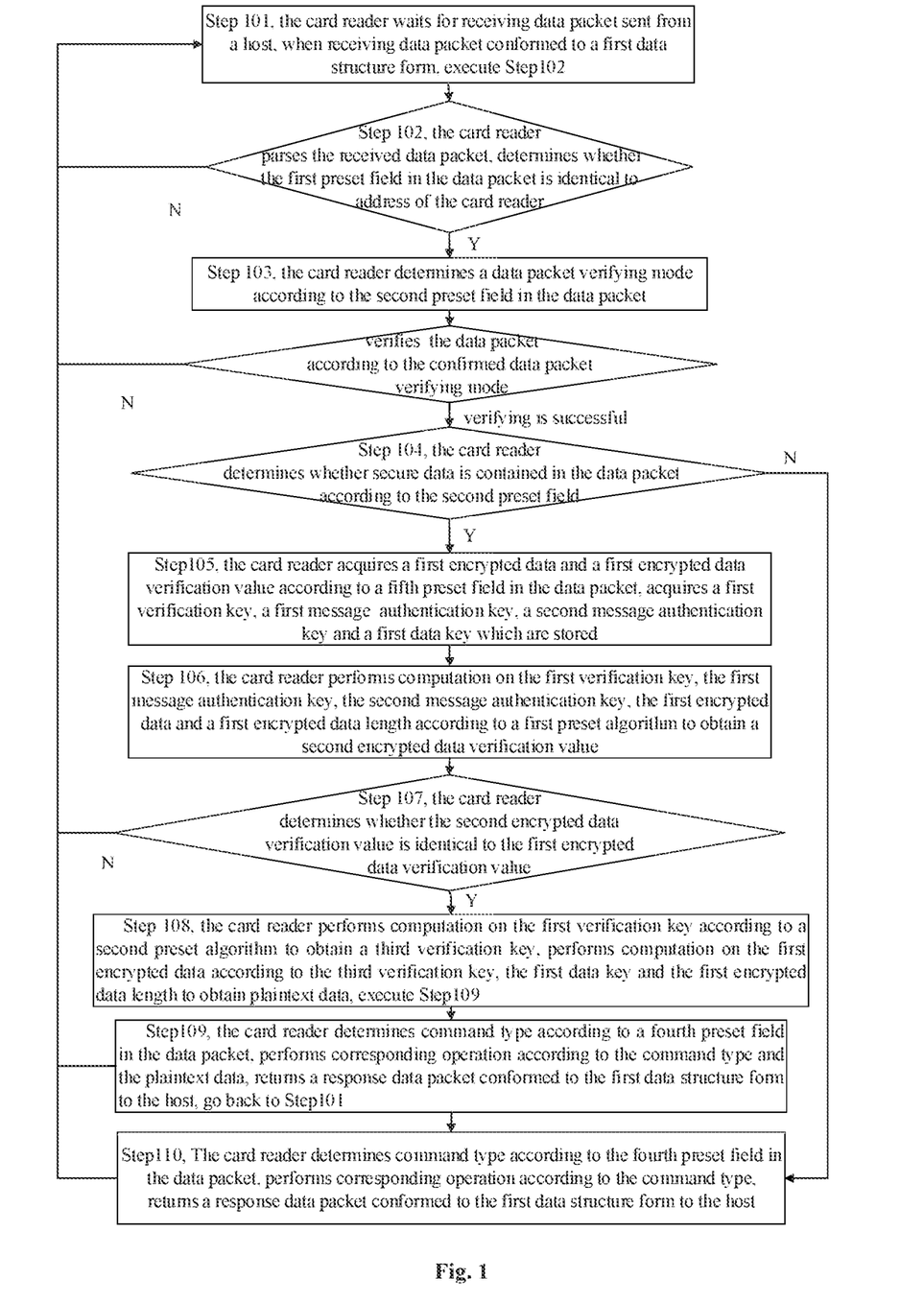
FIG. 1 is a flow chart of a method for data processing of Embodiment 1 of the present invention.

As shown in FIG. 1, the method includes the following steps.

Step 101, the card reader waits for receiving data packet sent from a host, when receiving data packet conformed to a first data structure form, execute Step 102.

In the present Embodiment 1, the data packet received by the card reader conforms to the first data structure form.

Specifically, the first data structure form includes at least a data head, a first preset field, data length field, a second preset field, a third preset field and a fourth preset field.

In this case, the first preset field represents card reader physical address;

the data length field represents byte length included by the data packet;

the second preset field represents control information field;

the third preset field represents data packet verification value; and the fourth preset field represents command code.

Preferably, the first data structure form can include a fifth preset field, a sixth preset field; in this case, the fifth preset field represents cipher data block; the sixth preset field represents plaintext data block.

For example, the length and value of the above fields specifically are shown as the following:

the data head has 1 byte, of which corresponding value is 0x53;

the card reader physical address has 1 byte, its corresponding value ranges from 0x00 to 0x7E;

the data length field has two bytes;

the control information field has 1 byte, in this case, the control information field includes data of three parts. In this case, the first bit of the byte and the second bit of the byte represent message sequence number, the message sequence number is for message transfer confirming and error verification; the third bit of the byte is verification mode, the verification mode includes check sum mode and CRC verification mode; the fourth bit of the byte is security setting item.

The command code is used for polling request, card reader device information acquiring request, card reader function acquiring request, local state reporting request, card reader input/output state reporting request, anti-dismantling state reporting request, outputting controlling, card reader LED controlling, buzzer controlling, card reader communication configuring request, secure channel establishing request, session key negotiating request, key verifying request, biometric data scanning and sending request, biometric data scanning and comparing request, receivable maximum number of bytes of host setting, extension data writing request.

Step 102, the card reader parses the received data packet, determines whether the first preset field in the data packet is identical to address of the card reader, if yes, execute Step 103, otherwise, go back to Step 101.

In Embodiment 1, that the card reader parses the received data packet specifically includes: the card reader divides the data in the data packet from high bit to low bit according to the bytes, the first byte is regarded flag data, the second byte is regarded as data head, the third byte is regarded as the first preset field, the fourth byte is regarded as high bit of the data length, the fifth byte is regarded as the low bit of the data length, the sixth byte is regarded as the second preset field, the seventh byte is regarded as length of secure data, the eighth byte is regarded as type of secure data, the bytes occupied by the fifth preset field is determined according to the seventh byte, the bytes occupied by the fifth preset field is after the eighth byte, the first byte of the fifth preset field is regarded as the ninth byte, one byte after the bytes occupied by the fifth preset field is regarded as the fourth preset field, one byte after the bytes occupied by the fourth preset field is regarded as the sixth preset field, two bytes after the bytes occupied by the sixth preset field are regarded as the third preset field.

Step 103, the card reader determines a data packet verifying mode according to the second preset field in the data packet, verifies the data packet according to the confirmed data packet verifying mode, if verifying is successful, execute Step 104, otherwise, go back to Step 101.

In Embodiment 1, preferably, determining a data packet verifying mode according to the second preset field in the data packet specifically is that the card reader acquires a first preset bit in the second preset field, determines a data packet verifying mode according to the first preset bit.

Preferably, verifying the data packet according to the confirmed data packet verifying mode specifically includes: the card reader performs computation on the data packet according to the confirmed data packet verifying mode to acquire a data packet verifying value, determines whether the data packet verifying value is identical to the third preset field in the data packet, if yes, execute Step 104, otherwise, return response data including error information to the host, go back to Step 101.

Step 104, the card reader determines whether secure data is contained in the data packet according to the second preset field, if yes, execute Step 105, otherwise, execute Step 110.

In Embodiment 1, preferably, that the card reader determines whether secure data is contained in the data packet according to the second preset field specifically includes: the card reader acquires a second preset bit in the second preset field, determines whether secure data is contained in the data packet according to the second preset bit.

Step 105, the card reader acquires a first encrypted data and a first encrypted data verification value according to a fifth preset field in the data packet, acquires a first verification key, a first message authentication key, a second message authentication key and a first data key which are stored.

In Embodiment 1, the first encrypted data and the first encrypted data verification value are generated by the host Step 106, the card reader performs computation on the first verification key, the first message authentication key, the second message authentication key, the first encrypted data and a first encrypted data length according to a first preset algorithm to obtain a second encrypted data verification value.

In Embodiment 1, the first preset algorithm is: AES encryption and decryption algorithm.

Step 107, the card reader determines whether the second encrypted data verification value is identical to the first encrypted data verification value, if yes, execute Step 108, otherwise, go back to Step 101.

Step 108, the card reader performs computation on the first verification key according to a second preset algorithm to obtain a third verification key, performs computation on the first encrypted data according to the third verification key, the first data key and the first encrypted data length to obtain plaintext data, execute Step 109.

In Embodiment 1, the present algorithm specifically is: negate calculation.

Preferably, performing computation on the first encrypted data according to the third verification key, the first data key and the first encrypted data length to obtain plaintext data specifically is: the card reader decrypts the first encrypted data via the third verification key, the first data key and the first encrypted data length according to the first preset algorithm to obtain plaintext.

In Embodiment 1, the first preset algorithm specifically is: AES encryption and decryption algorithm.

Step 109, the card reader determines command type according to a fourth preset field in the data packet, performs corresponding operation according to the command type and the plaintext data, returns a response data packet conformed to the first data structure form to the host, go back to Step 101.

Preferably, the command type specifically is extension write data.

Specifically, performing corresponding operation according to the command type and the plaintext data specifically includes: the card reader writes the plaintext data in the card.

In Embodiment 1, performing corresponding operation according to the command type and the plaintext data, returning a response data packet conformed to the first data structure form to the host specifically includes: the card reader performs corresponding operation according to the command type and the plaintext data to obtain a first result data, takes the second encrypted data verification value as a fifth verification key, performs computation on the fifth verification key according to a second preset algorithm to obtain a seventh verification key, performs computation on the first result data and length of the first result data according to the seventh verification key and the first data key to obtain a second encrypted data, performs computation according to the fifth verification key, the third message authentication key, the fourth message authentication key, the second encrypted data and the length of the second encrypted data to obtain a third encrypted data verification value, organizes the third encrypted data verification value, the second encrypted data and a response code corresponding to the operating command so as to obtain a response data packet conformed to the first data structure form.

Organizing the third encrypted data verification value, the second encrypted data and a response code corresponding to the operating command to obtain a response data packet conformed to the first data structure form specifically includes: the card reader acquires the flag data and data head, takes the card reader address as a first preset field, takes response data packet length obtained by calculating as a data packet length value, takes a controlling field as a second preset field, takes the third encrypted data verification value and a second encrypted data as a fifth preset field, takes data length of the fifth preset field as secure data length field, takes a response code corresponding to the operating command as a fourth preset field, obtains verification value of the response data packet by performing computation, takes the verification value as a third preset field, organizes the flag data, the data head, the first preset field, the data packet length field, the second preset field, the third preset filed, the fourth preset field, the fifth preset field and the secure data length field according to a preset mode to obtain data packet conformed to the first data structure form.

Step 110, The card reader determines command type according to the fourth preset field in the data packet, performs corresponding operation according to the command type, returns a response data packet conformed to the first data structure form to the host, go back to Step 101.

In Embodiment 1, the fourth preset field specifically is a command code.

In this case, the command type includes: polling request of which corresponding command code is 0x60; card reader device information acquiring request of which corresponding command is 0x61, card reader function acquiring request of which corresponding command code is 0x62; local state reporting request of which corresponding command code is 0x64; card reader input state reporting request of which corresponding command code is 0x65; card reader output state reporting request of which corresponding command code is 0x66; card reader anti-dismantling state reporting request of which corresponding command code is 0x67; outputting controlling command of which corresponding command code is 0x68, in this case, the output controlling command includes data block; the data block specifically includes number corresponding to outputting, controlling code corresponding to controlling mode and timing time; card reader LED controlling command of which corresponding command code is 0x69; buzzer controlling command of which corresponding command code is 0x6A; card reader communication configuring request of which corresponding command code is 0x6E; secure channel establishing request of which corresponding command code is 0X75; session key negotiating request of which corresponding command code is 0x76; key verifying command of which corresponding command code is 0x77; biometric data scanning and sending request of which corresponding command code is 0x73; biometric data scanning and comparing request of which corresponding command code is 0x74; receivable maximum number of bytes of host setting command of which corresponding command code is 0x7B; extension data writing request of which corresponding command code is 0xA1.

In Embodiment 1, performing corresponding operation according to the command type and returning data packet conformed to the first data structure form to the host specifically includes: the card reader performs corresponding operation according to command type to obtain a first result data, acquires flag data and data head, takes the card reader address as a first preset field, takes length value obtained by calculating data packet length to obtain a data packet length field, takes control field as a second preset field, takes a response code corresponding to the operating command as fourth preset field, takes the first result data as a sixth preset field, obtains verification value of the data packet by performing computation, takes the verification value as a third preset field, organizes the flag data, the data head, the first preset field, the data packet length field, the second preset field, the third preset field, the fourth preset field and the sixth preset field according to a preset mode to obtain data packet conformed to the first data structure form.

Preferably, organizing the flag data, the data head, the first preset field, the data packet length field, the second preset field, the third preset field, the fourth preset field and the sixth preset field according to a preset mode to obtain data packet conformed to the first data structure form specifically includes: regarding the flag data as the first byte, regarding the data head as the second byte, regarding the first preset field as the third byte, regarding the high bit of the data length as the fourth byte, regarding the low bit of the data length as the fifth byte, regarding the second preset field as the sixth byte, regarding the fourth preset field as the tenth byte, regarding the sixth preset field as the eleventh byte, setting the bytes from the seventh byte to the ninth bytes and from the twelfth byte to the sixteenth byte to be 0, concatenating bytes from the first byte to the sixteenth byte orderly to obtain a data packet conformed to the first data structure form and returning the data packet conformed to the first data structure form to the host.

Specifically, the first data structure form includes at least the data head, the first preset field, the data length field, the second preset field, the third preset field and the fourth preset field.

In this case, the fourth preset field specifically is a response code.

The response code is used for polling response, card reader device information response, card reader function response, local state reporting response, card reader input/output state reporting response, anti-dismantling state reporting response, outputting controlling response, card reader LED controlling response, buzzer controlling response, card reader communication configuring response, secure channel establishing response, session key negotiating response, key verifying response, biometric data scanning and sending response, biometric data scanning and comparing response, receivable maximum number of bytes of host setting response.

In this case, the response type includes: polling response of which corresponding response code is 0x40, card reader device identification response of which corresponding response code is 0x45, card reader function response of which corresponding response code is 0x46, local state reporting response of which corresponding response code is 0x48, card reader input/output state reporting response of which corresponding response code is 0x49|0x4A, card reader communication configuring response of which corresponding response code is 0x54, secure channel establishing response of which corresponding response code is 0x40, session key negotiating response of which corresponding response code is 0x76, key verifying response of which corresponding response code is 0x78.

Preferably, in Embodiment 1, in Step 110, the command type specifically is secure channel establishing command.

Preferably, performing corresponding operation according to the command type specifically includes: the card reader acquires a base key according to the fifth preset field in the data packet and stores the base key.

Preferably, in Embodiment 1, in Step 110, the command type specifically is session key negotiating command.

Preferably, performing corresponding operation according to the command type comprises: acquiring, by the card reader, a first random number according to the fifth preset field, generating a second random number, generating a first data key, a first message authentication key, a second message authentication key according to the first random number, the second random number and a stored base key, generating a first host key and a first card reader key according to the first random number, the second random number and the first data key, acquiring a card reader identification, organizing the card reader identification, the second random number, the first card reader key and a response code corresponding to the session key negotiating command to obtain a response data packet conformed to the first data structure.

Preferably, in Embodiment 1, in Step 110, the command type specifically is a key verifying command.

Preferably, performing corresponding operation according to the command type specifically includes: the card reader acquires a second host key according to the fifth preset field, determines whether the second host key is identical to the first host key generated by the card reader, if yes, the card reader authentication key and the first host key, organizes the first verification key and a response code corresponding to the key verifying command to obtain a response data packet conformed to the first data structure.

Specifically, in Embodiment 1, after the card reader and the host generate data key, the card reader and the host store a same verification key respectively, in the following text, the verification key in the card reader is regarded as a first verification key, the verification key in the host is regarded as a second verification key; in subsequent communicating process, the host and the card reader will acquire a current verification key according to their own stored verification key, perform encrypting/decrypting operation on the data according to a generated data key, perform digest operation on the encrypted data via the verification key so as to obtain a verification value which is for a receiving side to verify the data.

Embodiment 2

Embodiment 2 provides a method for data processing, which is adapted to an access control system including a card reader, a host and a card. In this case, there may be a plurality of card readers communicated with the host.

Figure 2:
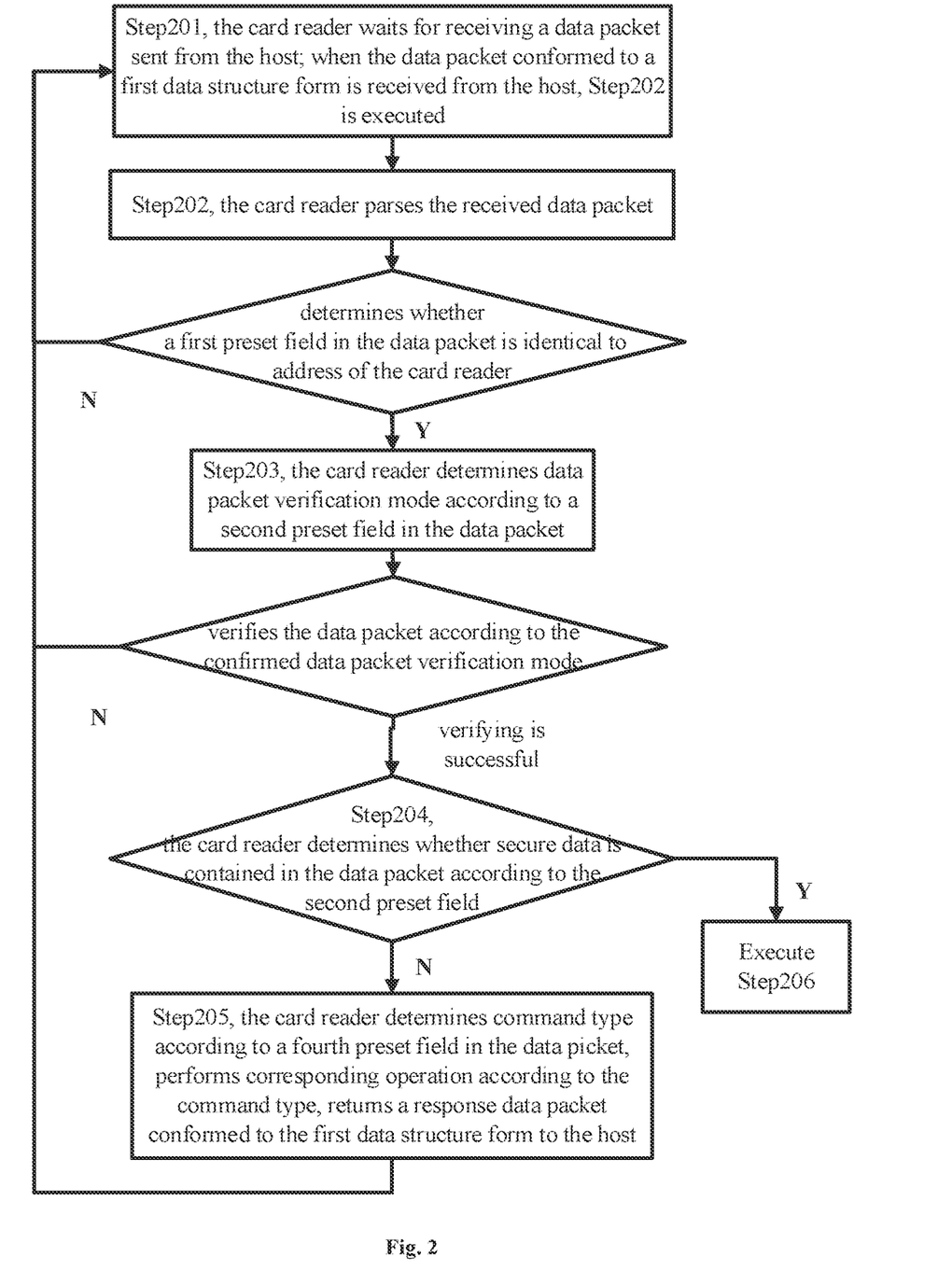
FIG. 2 and FIG. 3 are flow charts of a method for data processing of Embodiment 2 of the present invention.
Figure 3:
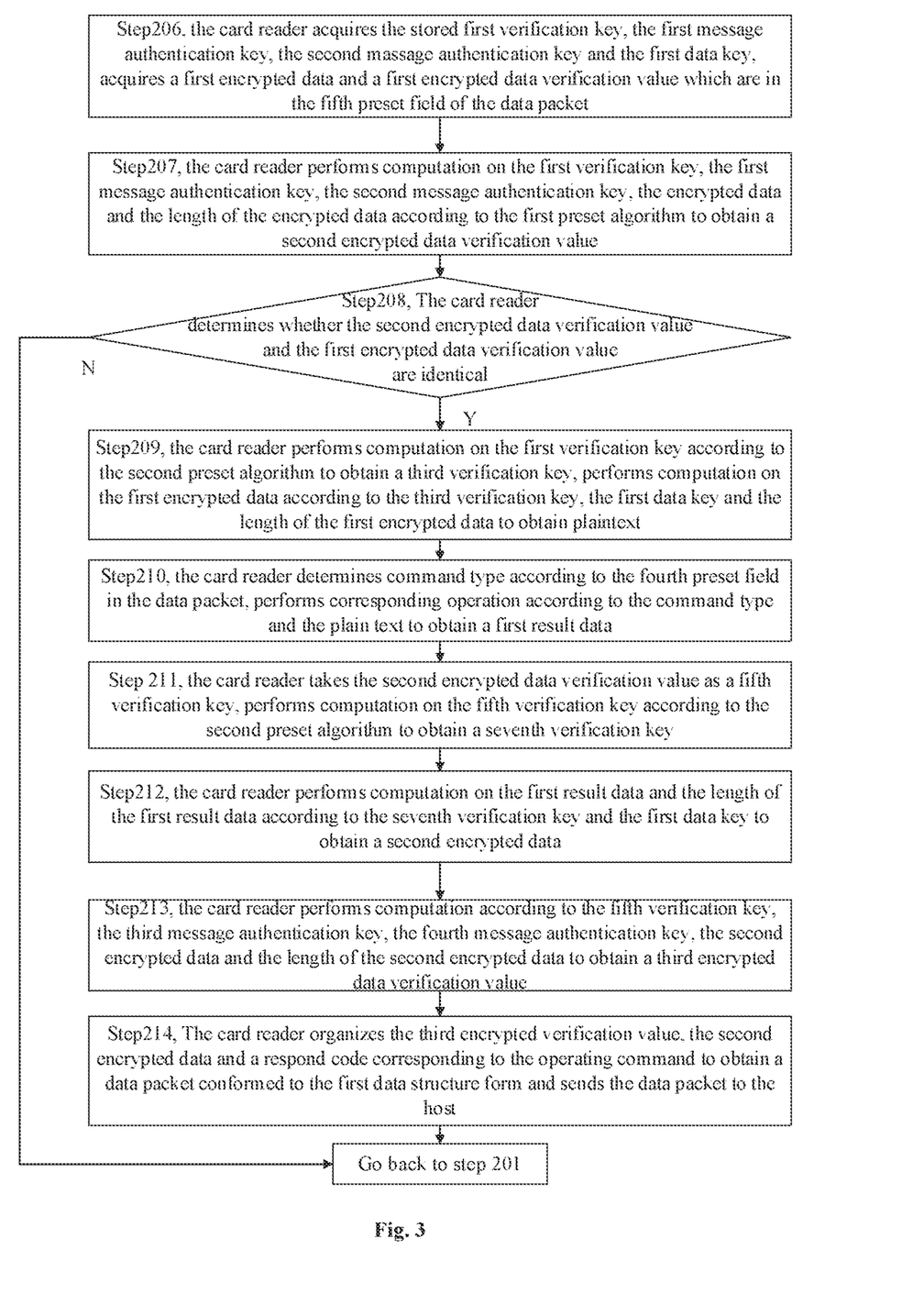

As shown in FIG. 2 and FIG. 3, the method includes the following steps.

Step 201, the card reader waits for receiving a data packet sent from the host; when the data packet conformed to a first data structure form is received from the host, Step 202 is executed.

Step 202, the card reader parses the received data packet, determines whether a first preset field in the data packet is identical to address of the card reader, if yes, Step 203 is executed; otherwise, go back to Step 201.

In Embodiment 2, the data packet received by the card reader is conformed to the first data structure form.

Specifically, the first data structure form includes at least data head, the first preset field, a data length field, a second preset field, a third preset field and a fourth preset field.

In this case, the value corresponding to the first preset field represents card reader physical address;
the value corresponding to the data length field represents length of bytes included in the data packet;
the value corresponding to the second preset field represents control information field;
the value corresponding to the third preset field represents data packet verification value; and
the value corresponding to the fourth preset field represents command code.

Preferably, the first data structure form further includes a fifth preset field, a sixth preset field; in this case, the value corresponding to the fifth preset field represents secure data block; the value corresponding to the sixth preset field represents plaintext data block, For example, the length and value of the above fields specifically includes: the data head has 1 byte of which corresponding value is 0x53;
the card reader physical address has 1 byte of which corresponding value ranges from 0x00 to 0x7E;
the data length field are two bytes;
the control information field has 1 byte, which includes data of three parts. In this case, the first bit and the second bit of the byte represents message sequence number, the message sequence number is used for message transfer and error verification; the third bit of the byte represents verification mode, the verification mode includes check sum verification mode and CRC verification mode; the fourth bit of the byte represents secure data setting item.

In Embodiment 2, the command type includes:
a first command which is polling request of which corresponding command code is 0x60;
a second command which is card reader device information acquiring request of which corresponding command is 0x61;
a third command which is card reader function acquiring request of which corresponding command code is 0x62;
a fourth command which is local state reporting request of which corresponding command code is 0x64;
a fifth command which is card reader input state reporting request of which corresponding command code is 0x65;
a sixth command is card reader output state reporting request of which corresponding command code is 0x66;
a seventh command is card reader anti-dismantling state reporting request of which corresponding command code is 0x67;
an eighth command is outputting controlling command of which corresponding command code is 0x68, in this case, the output controlling command includes data block; the data block specifically includes number corresponding to outputting, controlling code corresponding to controlling mode and timing time;
a ninth command is card reader LED controlling command of which corresponding command code is 0x69;
a tenth command is buzzer controlling command of which corresponding command code is x6A;
an eleventh command is card reader communication configuring request of which corresponding command code is x6E;
a twelfth command is secure channel establishing request of which corresponding command code is 0X75;
a thirteenth command is session key negotiating request of which corresponding command code is 0x76;
a fourteenth command is key verifying command of which corresponding command code is 0x77;
a fifteenth command is biometric data scanning and sending request of which corresponding command code is 0x73;
a sixteenth command is biometric data scanning and comparing request of which corresponding command code is 0x74; and
a seventeenth command is receivable maximum number of bytes of host setting command of which corresponding command code is 0x7B.

The command code is used for polling request, card reader device information acquiring request, card reader function acquiring request, local state reporting request, card reader input/output state reporting request, anti-dismantling state reporting request, outputting controlling, card reader LED controlling, buzzer controlling, card reader communication configuring request, secure channel establishing request, session key negotiating request, key verifying request, biometric data scanning and sending request, biometric data scanning and comparing request, receivable maximum number of bytes of host setting.

Step 203, the card reader determines data packet verification mode according to a second preset field in the data packet, verifies the data packet according to the confirmed data packet verification mode, if verifying is successful, execute Step 204, otherwise, go back to Step 201.

In Embodiment 2, preferably, determining data packet verification mode according to a second preset field in the data packet specifically is: the card reader acquires a first preset bit in the second preset field, determines data packet verification mode according to the first preset bit.

Preferably, verifying the data packet according to the confirmed data packet verification mode specifically is: the card reader performs computation on the data packet according to the confirmed data packet verification mode to obtain a data packet verification value, acquires a third preset field in the data packet, determines whether the data packet verification value obtained by performing computation is identical to the acquired third preset field, if yes, execute Step 204, otherwise, return response data including error information to the host, go back to Step 201.

For example, the first preset bit in the second preset field is 1, which represents that the data packet verification mode is check sum mode, the first preset bit in the second preset field is 0, which represents that the data packet verification mode is CRC verification mode.

Step 204, the card reader determines whether secure data is contained in the data packet according to the second preset field, if no, execute Step 205; if yes, execute Step 206.

In Embodiment 2, Step 204 specifically includes: the card reader acquires a preset bit in the second preset field, determines whether secure data is contained in the data packet according to the value corresponding to the preset bit.

For example, the value corresponding to the preset bit in the second preset field is 1, which represents that secure data is contained; the value corresponding to the preset bit in the second preset field is 0, which represents that secure data is not contained.

Step 205, the card reader determines command type according to a fourth preset field in the data picket, performs corresponding operation according to the command type, returns a response data packet conformed to the first data structure form to the host, go back to Step 201.

In Embodiment 2, before executing Step 205, the method further includes: the card reader determines whether the data packet includes a sixth preset field, if yes, the card reader acquires data in the sixth preset field, determines command type according to the fourth preset field in the data packet, performs corresponding operation according to the command type and the data in the sixth preset field, returns a response data packet conformed to the first data structure form to the host, go back to Step 201, otherwise, execute Step 205.

In Embodiment 2, preferably, when the command type is secure channel establishing command, performing corresponding operation according to the command type specifically is: acquiring data in the sixth preset field and storing the data; specifically, the data in the sixth preset field is base key.

For example, the command code corresponding to the secure channel establishing command is 0x75.

The base key is: 0x30 0x31 0x32 0x33 0x34 0x35 0x36 0x37 0x38 0x39 0x3a 0x3b 0x3c 0x3d 0x3e 0x3f.

Specifically, the base key specifically is generated by the host; further, the host organizes the base key and the command code to obtain response data packet conformed to the first data structure form and sends the response data packet to the card reader.

In Embodiment 2, preferably, when the command type is session key negotiating command, performing corresponding operation according to the command type specifically is: acquiring a first random number in a sixth preset field, generating a second random number, generating a first data key, a first message authentication key, a second message authentication key according to the first random number, the second random number and the base key, generates a first host key and a first card reader key according to the first random number, the second random number and the first data key, acquires a card reader identification, organizing the card reader identification, the second random number, the first card reader key and a response code corresponding to the session key negotiating command to obtain a response data packet conformed to the first data structure.

For example, the command code corresponding to the session key negotiating command is: 0x76:
the response code corresponding to the session key negotiating command is: 0x76;
for example, the first random number is: 0x40 0xC0 0x9F 0x61 0xCC 0xE 0x09 0x0A;
the second random number is: 0x1B 0x22 0x48 0xD3 0xD0 0x3C 0xB6 0x04.
a group of keys generated according to the first random number, the second random number and the base key includes:
the first data key which is: 0x23 0x0F 0xA4 0x1F 0xCD 0x49 0x1D 0xB4 0xD2 0xEF 0x86 0x1A 0x9A 0x84 0xC5 0x81;
the first message authentication key which is: 0xE4 0x07 0xA0 0x89 0x35 0x96 0x7B 0xD3 0x33 0xD1 x6E 0x98 0xA1 0xA4 0xF5 0x61;

the second message authentication key which is: 0xB7 0xAD 0x75 0xBB 0xF4 0x13 0xF5 0x5D 0x15 0x59 0x40 0x60 0xFF 0x94 0x86 0x5B;
the first host key which is: 0x38 0xDA 0x67 0xF1 0xD5 0x5A 0x14 0x06 0xD3 0xC5 0xB8 0x84 0x53 0x05 0x9B 0xCC; and
the first card reader key which is: 0x64 0xBC 0xE0 0x2E 0xAB 0xF1 0x89 0xB5 0x8A 0x0D 0x86 0x8C 0x90 0x67 0x52 0xDF.

Specifically, the first random number is generated by the host; further, the host organizes the first random number, the command code to obtain a response data packet conformed to the first data structure and sends the response data packet to the card reader.

Further, after the host receives the response data packet corresponding to the session key negotiating command sent from the card reader, the method further includes: the host generates a second data key, a third message authentication key, a fourth message authentication key according to the first random number, the second random number and the base key, generates a second host key and a second card reader key according to the first random number, the second random number and the second data key, organizes the second host key and the command code corresponding to the key verifying command to obtain a response data packet conformed to the first data structure and sends the response data packet to the card reader.

For example, the second data key is: 0x23 0x0F 0xA4 0x1F 0xCD 0x49 0x1D 0xB4 0xD2 0xEF 0x86 0x1A 0x9A 0x84 0xC5 0x81;
the third message authentication key is: 0xE4 0x07 0xA0 0x89 0x35 0x96 0x7B 0xD3 0x33 0xD1 x6E 0x98 0xA1 0xA4 0xF5 0x61;
the fourth message authentication key is: 0xB7 0xAD 0x75 0xBB 0xF4 0x13 0xF5 0x5D 0x15 0x59 0x40 0x60 0xFF 0x94 0x86 0x5B;
the second host key is: 0x38 0xDA 0x67 0xF1 0xD5 0x5A 0x14 0x06 0xD3 0xC5 0xB8 0x84 0x53 0x05 0x9B 0xCC; and
the second card reader key is: 0x64 0xBC 0xE0 x2E 0xAB 0xF1 0x89 0xB5 x8A 0x0D 0x86 0x8C 0x90 0x67 0x52 0xDF.

In Embodiment 2, preferably, when the command type is key verifying command, performing operation corresponding to the command type specifically includes: obtaining a second host key in the sixth preset field, determining whether the second host key and the first host key generated by the card reader are identical, if yes, generating a first verification key according to the first message authentication key, the second message authentication key and the first host key, organizing the first verification key and a response code corresponding to the key verifying command to obtain a response data packet conformed to the first data structure.

For example, the command code corresponding to the key verifying command is: 0x77;
the first verification key generated according to the first message authentication key, the second message authentication key and the first host key is: 0x39 0x97 0x2F 0x9F 0x3F 0x56 0x28 0x36 0x91 0x71 0x5F 0x27 0x48 0xAC 0x71 0x60; and
the response code corresponding to the key verifying command is: 0x78.

Specifically, the second host key is generated by the host; further, after the host receives the key verifying command response data sent from the card reader, the method further includes: the host acquires first verification key in the data packet, generates a second verification key according to a third message authentication key, a fourth message authentication key and the second host key, determines whether the second verification key and the first verification key are identical, if yes, stores the second verification key.

For example, the second verification key generated according to the third message authentication key, the fourth authentication key and the second host key is: 0x39 0x97 0x2F 0x9F 0x3F 0x56 0x28 0x36 0x91 0x71 0x5F 0x27 0x48 0xAC 0x71 0x60.

Specifically, in Embodiment 2, after the card reader and the host generate data keys, the card reader and the host store a same verification key respectively, in the following text, the verification key in the card reader is regarded as a first verification key, the verification key in the host is regarded as a second verification key; in subsequent communicating process, the host and the card reader will acquire a current verification key according to their own stored verification key, perform encrypting/decrypting operation on the data according to a generated data key, perform digest operation on the encrypted data via the verification key to obtain a verification value which is for a receiving side to verify the data.

In Embodiment 2, the response data returned from the card reader to the host is data packet conformed to the first data structure form.

Specifically, the first data structure form includes at least data head, the first preset field, the data length field, the second preset field, the third preset field, the fourth preset field; in this case, the fourth preset field represents a response code.

In this case, the value corresponding to the polling response is 0x40;
the value corresponding to card reader device identification response is 0x45;
the value corresponding to card reader function response is 0x46;
the value corresponding to local state reporting response is 0x48;
the value corresponding to card reader input/output state reporting response is 0x49/0x4A;
the value corresponding to card reader communication configuring response is 0x54;
the value corresponding to secure channel establishing response is 0x40;
the value corresponding to session key negotiating response is 0x76; and the value corresponding to key verifying response is 0x78.

The response code is used for polling response, card reader device information response, card reader function response, local state reporting response, card reader input/output state reporting response, anti-dismantling state reporting response, outputting controlling response, card reader LED controlling response, buzzer controlling response, card reader communication configuring response, secure channel establishing response, session key negotiating response, key verifying response, biometric data scanning and sending response, biometric data scanning and comparing response, receivable maximum number of bytes of host setting response.

Step 206, the card reader acquires the stored first verification key, the first message authentication key, the second massage authentication key and the first data key, acquires a first encrypted data and a first encrypted data verification value which are in the fifth preset field of the data packet.

In Embodiment 2, the first encrypted data and the first encrypted data verification value are generated by the host.

Specifically, the host acquires the stored verification key, the third message authentication key, the fourth message authentication key, the second data key, performs computation on the second verification key according to a preset algorithm to obtain a fourth verification key, performs computation on data to be encrypted and length of the data to be encrypted according to the fourth verification key and the second data key to obtain a first encrypted data, performs computation according to the second verification key, the third message authentication key, the fourth message authentication key, the first encrypted data and length of the first encrypted data to obtain a first encrypted data verification value, organizes the first encrypted data verification value, the first encrypted data and an operating command code to obtain a data packet conformed to the first data structure form, and sends the data packet to the card reader.

For example, the store first verification key is: 0x6A 0x92 0x87 0xB8;
the first message authentication key is: 0xE4 0x07 0xA0 0x89 0x35 0x96 0x7B 0xD3 0x33 0xD1 x6E 0x98 0xA1 0xA4 0xF5 0x61;
the second massage authentication key is: 0xB7 0xAD 0x75 0xBB 0xF4 0x13 0xF5 0x5D 0x15 0x59 0x40 0x60 0xFF 0x94 0x86 0x5B;
the first data key is: 0x23 0x0F 0xA4 0x1F 0xCD 0x49 0x1D 0xB4 0xD2 0xEF 0x86 0x1A 0x9A 0x84 0xC5 0x81; and
the first encrypted data is: 0xAD 0x23 x0F 0x28 0xB6 0xE9 0x7B 0x97 0x47 0x0F 0xA2 0xC1 x9A 0x96 0xC1 0x3C 0x08 0x27 0x1D 0x88 0xEF 0x4E 0xD6 0x98 0xE4 0x8F 0x4E 0x4C 0x6A 0x31 0x30 0x6B.

Step 207, the card reader performs computation on the first verification key, the first message authentication key, the second message authentication key, the encrypted data and the length of the encrypted data according to the first preset algorithm to obtain a second encrypted data verification value.

For example, the length of the encrypted data is: 32 bytes; and
the second encrypted data verification value obtained by performing computation is: 0x6A 0x92 0x87 0xB8.

Step 208, the card reader determines whether the second encrypted data verification value and the first encrypted data verification value are identical to each other, if yes, execute Step 209; otherwise, go back to Step 201.

Step 209, the card reader performs computation on the first verification key according to the second preset algorithm to obtain a third verification key, performs computation on the first encrypted data according to the third verification key, the first data key and the length of the first encrypted data to obtain plaintext, execute Step 210.

For example, the plain text obtained by performing computation is: 0x01 0x10 0xEA 0x5B 0x59 0x87 0x85 0x00 0xDB 0x73 0xAD 0x60 0xF9 x9A 0xD5 0xB9 0x94 0x95 0x800 x00 0x000x000x 000x000x000x000x000x000x000x000x000x00.

Step 210, the card reader determines command type according to the fourth preset field in the data packet, performs corresponding operation according to the command type and the plain text to obtain a first result data, execute Step 211.

Step 211, the card reader takes the second encrypted data verification value as a fifth verification key, performs computation on the fifth verification key according to the second preset algorithm to obtain a seventh verification key.

In Embodiment 2, the second preset algorithm specifically is: negate calculation.

For example, the fifth verification key is: 0x6A 0x92 0x87 0xB8; and the seventh verification key is: 0x3C 0xBA 0x41 0xE0.

Step 212, the card reader performs computation on the first result data and the length of the first result data according to the seventh verification key and the first data key to obtain a second encrypted data.

Step 213, the card reader performs computation according to the fifth verification key, the third message authentication key, the fourth message authentication key, the second encrypted data and the length of the second encrypted data to obtain a third encrypted data verification value.

Step 214, The card reader organizes the third encrypted verification value, the second encrypted data and a respond code corresponding to the operating command to obtain a data packet conformed to the first data structure form and sends the data packet to the host, go back to Step 201.

In Embodiment 2, obtaining the data packet conformed to the first data structure form by organizing specifically includes: the card reader obtains flag data and data head, takes the address of the card reader as the first preset field, calculates length of the data packet and takes the length of the data packet as data packet length field, takes controlling field as the second preset field, takes the third encrypted data verification value and the second encrypted data as the fifth preset field, calculates data length of the fifth preset field and takes the data length of the fifth preset field as secure data length field, takes a response code corresponding to the operating command as the fourth preset field, calculates verification value of the data packet, takes the verification value as the third preset field, organizes the flag data, the head data, the first preset field, the data packet length field, the second preset field, the third preset field, the fourth preset field, the fifth preset field and the secure data length field according to a preset mode to obtain the data packet conformed to the first data structure form.

Preferably, organizing the flag data, the head data, the first preset field, the data packet length field, the second preset field, the third preset field, the fourth preset field, the fifth preset field and the secure data length field according to a preset mode to obtain the data packet conformed to the first data structure form specifically includes: taking the flag data as the first byte, taking the data head as the second byte, taking the first preset field as the third byte, taking the high bit of the data length as the fourth byte, taking the low bit of the data length as the fifth byte, taking the second preset field as the sixth byte, taking the length of the secure data as the seventh byte, taking the type of the secure data as the eighth byte, taking the fifth preset field as the ninth byte, taking the fourth preset field as the tenth byte, setting bytes from the eleventh byte to the sixteenth byte to be 0, concatenating bytes from the first byte to the sixteenth byte orderly to obtain the data packet conformed to the first data structure form.

In Embodiment 2, specifically, after the host receives the data packet sent from the card reader, the method further includes: the host acquires the second encrypted data and the third encrypted data verification value in the data packet, takes the stored first encrypted data verification value as a sixth verification key, acquires the third message verification key, the fourth message verification key and the second data key, performs computation on the sixth verification key, the third message verification key, the fourth message verification key, the second encrypted data and the length of the second encrypted data according to a first preset algorithm to obtain a fourth encrypted data verification value, determines whether the fourth encrypted data verification value and the third encrypted data verification value are identical, if yes, perform computation on the sixth verification key according a preset algorithm to obtain an eighth verification key, perform computation on the second encrypted data according to the eighth verification key, the second data key and the length of the second encrypted data to obtain plain text data.

In the present application, data conformed to a preset data structure form is transferred for communication between the card reader and the host. In process of communication, data can be encrypted via the data key, meanwhile, verification key can be used for verifying encrypted/decrypted data, which can avoid that the communication data is monitored, stolen or tampered, therefore, security of transferred data is assured.

Embodiment 3

Figure 4:
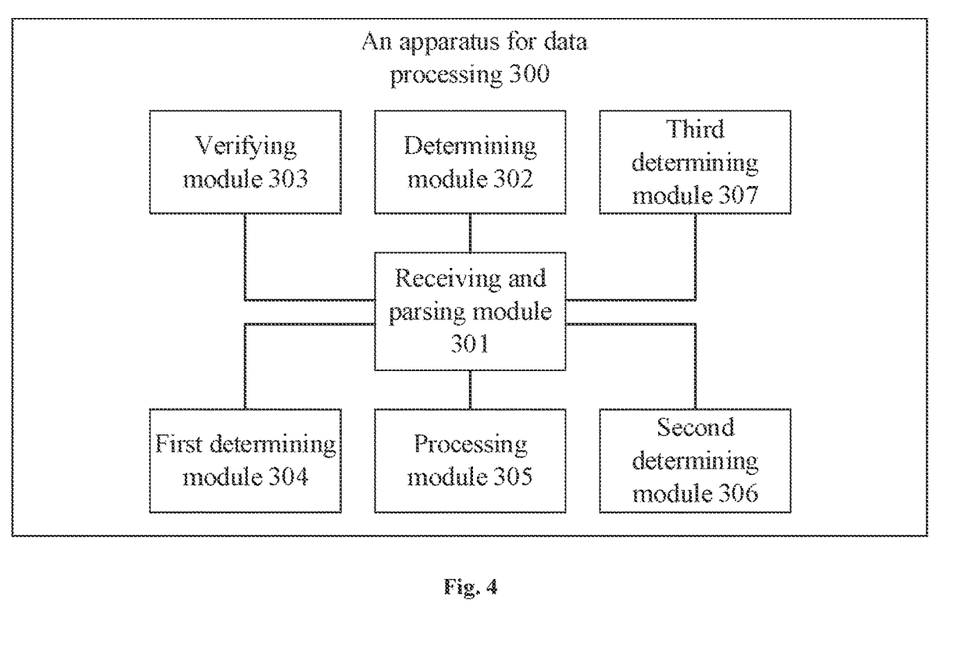
FIG. 4 is a block diagram of an apparatus for data processing of Embodiment 3 of the present invention.

Based on technical solution provided by the method for data processing in the present application, the present application provides an apparatus for data processing correspondingly, as shown in FIG. 4, the device for data processing 300 of the present application can include:

a receiving and parsing module 301 configured to receive data packet sent from a host and parse the received data packet;

a determining module 302 configured to determine whether a first preset field in the data packet is identical to the address of the card reader;

a verifying module 303 configured to determine data packet verifying mode according to a second preset field in the data packet and verify the data packet according to the data packet verifying mode;

a first determining module 304 configured to determine whether secure data is contained in the data packet according to the second preset field;

a processing module 305 configured to acquire a first encrypted data and a first encrypted data verification value according to a fifth preset field in the data packet, acquire a first verification key, a first message authentication key, a second message authentication key and a first data key which are stored, perform computation on the first verification key, the first message authentication key, the second message authentication key, the first encrypted data and a first encrypted data length according to a first preset algorithm to obtain a second encrypted data verification value, determine whether the second encrypted data verification value is identical to the first encrypted data verification value, if yes, to perform computation on the first verification key according to a second preset algorithm to obtain a third verification key, perform computation on the first encrypted data according to the third verification key, the first data key and the first encrypted data length to obtain plaintext data;

a second determining module 306 configured to determine command type according to a fourth preset field in the data packet, perform corresponding operation according to the command type and the plaintext data to obtain a first result data, return a response data packet conformed to the first data structure form to the host;

a third determining module 307 configured to determine command type according to the fourth preset field in the data packet, perform corresponding operation according to the command type, return a response data packet conformed to the first data structure form to the host.

Embodiment 3 provides an electronic device, which includes a storage configured to store non-volatile computer-readable instructions, and a processor configured to run the non-volatile computer-readable instructions to enable the processor to perform the method for data processing when the computer-readable instructions executed by the processor.

The present application provides a computer-readable storage medium configured to store non-volatile computer-readable instructions, when the computer-readable instructions run on the computer to enable the computer to perform the method for data processing.

The present application further provides a computer-readable storage medium adapted to any embodiment of the method for data processing described above. No more detail is given here.

A method and an apparatus for processing data and a computer-readable storage medium is described in details above. The above description of the embodiments is merely to assist in understanding the method of the present disclosure and its core idea. At the same time, one of ordinary skill in the art might make various modifications on specific embodiments or its application scope according to the idea of the present disclosure. Thus, the content of the description above is not to limit the present invention.

The invention claimed is:

1. A method for processing data, comprising the following steps:
(101) waiting for, by a card reader, receiving a data packet sent from a host, executing Step 102 when receiving the data packet conformed to a first data structure form;
(102) parsing, by the card reader, the data packet received, determining whether a first preset field in the data packet is identical to an address of the card reader, if yes, executing Step 103, otherwise, going back to Step 101;
(103) determining, by the card reader, a data packet verifying mode according to a second preset field in the data packet, verifying the data packet according to the data packet verifying mode, if verifying is successful, executing Step 104, otherwise, going back to Step 101;
(104) determining, by the card reader, whether any secure data is contained in the data packet according to the second preset field, if yes, executing Step 105, otherwise, executing Step 107;
(105) acquiring, by the card reader, one first encrypted data and a first encrypted data verification value according to a fifth preset field in the data packet; acquiring a first verification key, a first message authentication key, a second message authentication key and a first data key which are stored; performing computation on the first verification key, a first message authentication key, the second message authentication key, the first encrypted data and a first encrypted data length according to a first preset algorithm so as to obtain a second encrypted data verification value; determining whether the second encrypted data verification value is identical to the first encrypted data verification value, if yes, performing computation on the first verification key according to a second preset algorithm so as to obtain a third verification key; performing computation on the first encrypted data according to the third verification key, the first data key and the first encrypted data length so as to obtain plaintext data, executing Step 106, otherwise, going back to Step 101;
(106) determining, by the card reader, a command type according to a fourth preset field in the data packet, performing a corresponding operation according to the command type and the plaintext data, returning a response data packet conformed to the first data structure form to the host, then going back to Step 101;
(107) determining, by the card reader, the command type according to the fourth preset field in the data packet, performing the corresponding operation according to the command type, returning the response data packet conformed to the first data structure form to the host, then going back to Step 101;
wherein in Step 106, performing the corresponding operation according to the command type and the plaintext, and returning the response data packet conformed to the first data structure form to the host specifically comprises:
performing, by the card reader, the corresponding operation according to the command type and the plaintext data so as to obtain first result data; taking the second encrypted data verification value as a fifth verification key; performing computation on the fifth verification key according to the second preset algorithm so as to obtain a seventh verification key; performing computation on the first result data and a length of the first result data according to the seventh verification key and the first data key so as to obtain the second encrypted data; performing computation according to the fifth verification key, a third message authentication key, a fourth message authentication key, the second encrypted data and the length of the second encrypted data so as to obtain a third encrypted data verification value; organizing the third encrypted data verification value, the second encrypted data and a response code corresponding to the operating command, so as to obtain the response data packet conformed to the first data structure form; and
organizing the third encrypted data verification value, the second encrypted data and the response code corresponding to the operating command so as to obtain the response data packet conformed to the first data structure form specifically comprises:
acquiring, by the card reader, flag data and a data head; taking the address of the card reader as the first preset field; calculating a response data packet length to obtain a length value as a data packet length value; taking a controlling field as the second preset field; taking the third encrypted data verification value and the second encrypted data as the fifth preset field; calculating a data length of the fifth preset field as a secure data length field; taking the response code corresponding to the operating command as the fourth preset field; obtaining a verification value of the response data packet by performing computation; taking the verification value as a third preset field; organizing the flag data, the data head, the first preset field, the data packet length field, the second preset field, the third preset field, the fourth preset field, the fifth preset field and the secure data length field according to a preset mode, so as to obtain the data packet conformed to the first data structure form.

2. The method of claim 1, wherein:
in Step 107, the command type comprises a secure channel building command; and
performing the corresponding operation according to the command type comprises: acquiring, by the card reader, a base key according to a sixth preset field in the data packet, and storing the base key.

3. The method of claim 2, wherein:

in Step 107, the command type further comprises a session key negotiating command; and performing the corresponding operation according to the command type comprises: acquiring, by the card reader, a first random number according to the sixth preset field in the data packet; generating a second random number; generating the first data key, the first message authentication key, and the second message authentication key according to the first random number, the second random number and the base key stored and storing the first data key, the first message authentication key, and the second message authentication key; generating a first host key and a first card reader key according to the first random number, the second random number and the first data key; acquiring a card reader identification; organizing the card reader identification, the second random number, the first card reader key and a response code corresponding to the session key negotiating command, so as to obtain the response data packet conformed to the first data structure form.

4. The method of claim 3, wherein:

in Step 107, the command type further comprises a key verifying command; and performing the corresponding operation according to the command type specifically comprises: acquiring, by the card reader, a second host key according to the sixth preset field in the data packet; determining whether the second host key and the first host key generated by the card reader itself are identical, if yes, generating the first verification key according to the first message authentication key, the second message authentication key and the first host key, and storing the first verification key; organizing the first verification key and a response code corresponding to the key verifying command, so as to obtain the response data packet conformed to the first data structure form.

5. The method of claim 1, wherein determining the data packet verifying mode according to the second preset field in the data packet specifically is: acquiring, by the card reader, a first preset bit in the second preset field, and determining the data packet verification mode according to the first preset bit.

6. The method of claim 1, wherein verifying the data packet according to the data packet verifying mode specifically is: performing, by the card reader, computation on the data packet according to the data packet verifying mode confirmed so as to obtain a data packet verification value; determining whether the data packet verification value obtained is identical to the third preset field in the data packet, if yes, executing Step 104, otherwise, returning a response data including error information to the host, then going back to Step 101.

7. The method of claim 1, wherein determining, by the card reader, whether the secure data is contained in the data packet according to the second preset field specifically comprises: obtaining, by the card reader, a second preset bit in the second preset field, and determining whether the data packet contains the secure data according to the second preset bit.

* * * * *